United States Patent Office 2,936,283
Patented May 10, 1960

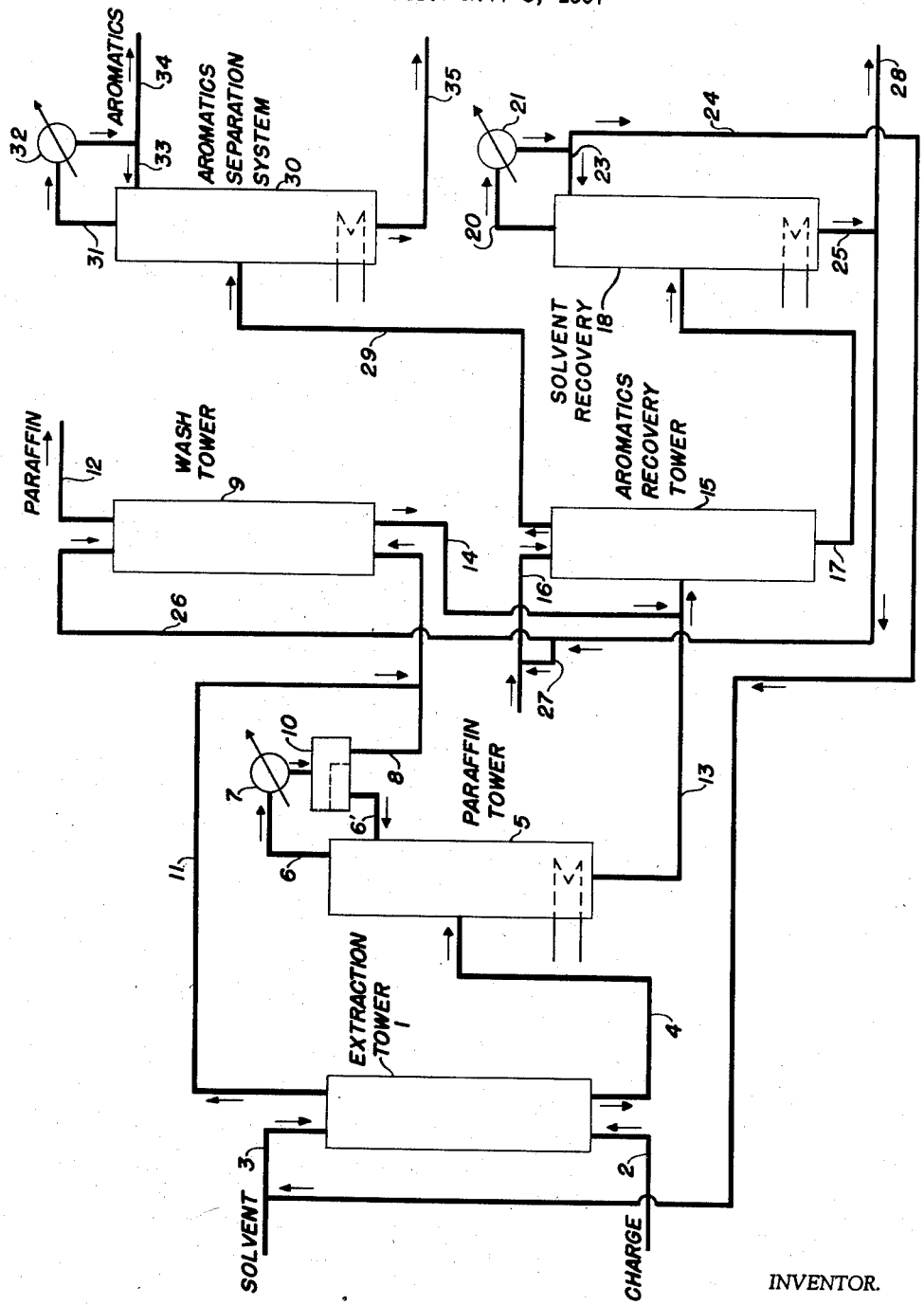

2,936,283

EXTRACTION PROCESS WHEREIN THE DESIRED MATERIAL IS RECOVERED BY AZEOTROPIC DISTILLATION OF THE EXTRACT

Le Roi E. Hutchings, Crystal Lake, Ill., assignor to The Pure Oil Company, Chicago, Ill., a corporation of Ohio Application November 8, 1957, Serial No. 695,410

21 Claims. (Cl. 208—321)

This invention relates to an extraction process for the recovery of aromatic hydrocarbons and alkyl-substituted homologues thereof from hydrocarbon mixtures containing non-aromatic hydrocarbons. More particularly, this invention relates to an improved solvent extraction process and technique for the recovery of the extract from the extract phase.

The art recognizes the difficulties attendant on the separation of hydrocarbons having similar boiling points, and many methods have been perfected for effecting such separations, including highly complex fractional distillations, chemical processes, selective adsorption, solvent extraction and the like. The solvent extraction process has been explored with particular vigor because of the availability of a vast number of new solvents and the general simplicity and efficiency of this method. For this purpose, many different solvents have been proposed and connected with various techniques for recovery of the desired extract from the extract phase and for solvent purification. Ordinarily in these solvent extraction processes, the extraction is effected in the liquid phase by thoroughly mixing the hydrocarbon mixture with the solvent, allowing the resultant mixture to separate into two phases and separating the phases by decantation. In vapor phase extractions the solvent is passed countercurrently to the vaporized hydrocarbon mixture in a contacting column equipped with extended contact surfaces. The overhead vapor phase contains the relatively more saturated hydrocarbons and the down-flowing liquid phase is essentially solvent plus the less saturated hydrocarbons, such as aromatics.

The main problem in either vapor or liquid phase extractions of hydrocarbon mixtures is the separation of the aromatics from the solvent phase. The more effective the extractive characteristics of the solvent, the less ideal the solvent phase becomes, and consequently the separation is correspondingly more difficult. Simple distillation or fractionation sometimes results in incomplete separation or contamination of the extract due to solvent decomposition at the temperature necessary to accomplish separation. Also if the separation is not complete, the recycled solvent gradually loses its efficiency due to the accumulation of undesirable fractions therein. Where there is some contamination of the extract phase from the solvent extraction, separation of the aromatics from the solvent is further complicated.

This invention is based on the discovery that, contrary to the known prior art, the distillation of the extract phase obtained when stable carbamate solvents are employed results in an overhead azeotropic fraction which, on total condensation, separates into two liquid phases, namely, a lower carbamate solvent phase and an upper phase comprising non-aromatic or paraffinic hydrocarbons. The steps of the process comprise contacting the hydrocarbon mixture with a stable carbamate solvent to produce an extract and a raffinate phase, fractionating the extract phase, totally condensing the overhead azeotrope and separating a lower solvent phase and an upper liquid paraffinic phase, mixing the raffinate phase with said liquid paraffinic phase, water washing these mixed phases, separating a combined paraffinic and raffinate phase from a water phase, mixing the water phase with the paraffinic-denuded extract phase (bottoms from the distillation), separating a solvent-water phase and an aromatic hydrocarbon phase therefrom, distilling the aromatic hydrocarbon phase, and separating the water from the solvent-water phase for recycle to the water-washing step.

Accordingly, it becomes a primary object of this invention to provide an improved process for the solvent extraction of hydrocarbon mixtures.

Another object of the invention is to provide an improved process for the solvent extraction of hydrocarbon mixtures using a carbamate solvent.

Still another object of the invention is to provide a solvent extraction process for the recovery of aromatic hydrocarbons from hydrocarbon mixtures wherein the paraffins are separated from the extract phase as a minimum-boiling azeotrope of solvent and paraffins.

A further object of the invention is to provide a solvent extraction process for the recovery of aromatics from hydrocarbon mixtures wherein a particular method of extract-phase distillation and raffinate treatment is employed to achieve more complete solvent recovery and more efficient aromatic production.

These and other objects will become apparent or be described as the invention is set forth in more detail.

The process of this invention is best understood by reference to the attached drawing which is a flow diagram illustrating the general relationship of the process steps. Referring to the drawing, the charge oil containing aromatics enters the bottom of extraction tower 1 through line 2 and is countercurrently contacted with down-flowing solvent entering at line 3. The solvent may be dimethyl ammonium dimethyl carbamate or any other similar, carbamate-type solvent, such as methylethyl ammonium methylethyl carbamate, which has a comparable boiling point and other requisite properties. The solvent ratio may vary, in general being sufficient to extract substantially all of the aromatics from the charge. It is not necessary to adjust the selectivity of the solvent to a high level, since further purification of the aromatics contained in the extract occurs in the next processing step.

The extract phase from extraction tower 1 passes through line 4 to paraffin tower 5 wherein it is fractionated, and an overhead fraction is removed through line 6. This overhead fraction or azeotrope is totally condensed in condenser 7, and the condensate separates into two phases in separator 10. The azeotropic stream in line 6 is at a temperature of about 120° to 140° F., depending on the conditions in tower 5, and condenser 7 reduces the temperature of this stream below its boiling point, that is, below 140° F., to about 80° F. or cooling water temperature. The heavier, solvent phase returns to tower 5 via line 6, and the lighter, paraffin-rich phase passes through line 8 to wash-tower 9 for solvent recovery. The solvent phase returned to tower 5 serves to extract aromatics from vapors rising in the tower. Alternatively, tower 5 may be a series of towers in which the overhead fraction from the first tower consists of essentially pure paraffins and the overhead fraction from the last tower contains a substantial proportion of aromatics and is recycled to the extraction tower or to the first naphtha tower.

The hydrocarbon phase from separator 10, consisting primarily of paraffinic compounds, passes through line 8 to wash-tower 9 wherein it is countercurrently contacted with water to remove the solvent. The hydrocarbon, paraffin-rich phase passing from separator 10 to wash-tower 9 is joined by raffinate from extraction tower 1 flowing through line 11, and the two streams, after being freed of solvent by water-washing in wash-tower 9, are withdrawn as product through line 12 to storage. If aromatics are being recovered from a gasoline reforming operation, stream 12 may contain naphthenes, in which case all or part of it may be recycled to the reforming reactor. The solvent phase from paraffin tower 5, containing aromatics and being essentially free of paraffins, is withdrawn from the tower through line 13 and is mixed with effluent water flowing through line 14 from wash-tower 9. This addition of water to aromatics-solvent stream 13 causes a separation of the aromatics from the solvent. The mixture then passes into aromatics recovery tower 15 wherein the aromatics rise countercurrent to additional fresh water entering at line 16, and are freed of the last traces of solvent. The solvent and water leave the bottom of tower 15 through line 17 and flow to solvent recovery-tower 18 where the solvent is separated and water is recovered for recycling to the process, or for disposal. Solvent taken overhead from tower 18 passes through line 20 and condenser 21, and reflux condensate is returned via lnie 23. The main portion of solvent is recycled through line 24 to join solvent stream 3 entering extraction tower 1. Water is withdrawn through line 25 and returned to wash-tower 9 and aromatics recovery-tower 15 through lines 26 and 27, respectively. Excess water is discarded through line 28.

Purified aromatics leave aromatics recovery-tower 15 through line 29 and flow to aromatics separating-system 30. If only two aromatics fractions, e.g., benzene and toluene, are to be recovered, aromatics separation-system 30 consists of only one tower, as shown, but other pure aromatics may be recovered by the provision of additional towers as required. A drier (not shown) may be employed to remove traces of moisture from the aromatic stream prior to distillation in column 30. In a gasoline reforming operation, the individual aromatic compounds are not separated but are sent directly to storage from aromatics recovery-tower 15 for blending into gasoline. Purified aromatics of lower boiling point are taken off at line 31 and pass through condenser 32. Reflux is provided by line 33, and product is taken off at line 34.

In the recovery of aromatics from mixtures in which they are present in concentrations of about 50% or more, it has been found to be particularly expedient to eliminate extraction tower 1 and charge a mixture of solvent and feed directly to paraffin tower 5. In such a process, a solvent ratio of about 1 can be used. As another alternative in a gasoline reforming operation, the feed may be fractionated into two fractions, in which case the lighter fraction is charged to the process of this invention and the heavier fraction is charged to an extraction unit employing ordinary distillation procedures for solvent recovery. In separating benzene and toluene as the aromatics, the latter will be recovered at line 35.

The following specific examples illustrate the process of my invention:

EXAMPLE 1

Two hundred cubic centimeters of catalytic reformate containing 43.6% v. aromatics were contacted with 800 cc. of dry dimethyl ammonium dimethyl carbamate in a single-stage extraction. The 76 cc. of raffinate so obtained were washed three times with equal volumes of water, and 72 cc. of hydrocarbons containing 24.5% v. aromatics were obtained. The extract phase was distilled, using a crankcase dilution apparatus to separate the overhead condensate into two liquid fractions and return the separated solvent phase to the distillation column. This was accomplished by operating the condenser at a temperature of about 90° to 110° F. and resulted in the separation of about 1 volume of paraffins per volume of solvent. The column contained less than two theoretical stages. Fifty-two cubic centimeters of the paraffin-rich fraction, containing only 3.8% aromatics, were taken overhead. Seventy-six cubic centimeters of an aromatics-rich fraction, containing 89.4% aromatics, were recovered from the still bottoms by water dilution and water washing. The azeotropic overhead had a boiling range of about 120° F. to 140° F., which was below the boiling point of the paraffins in the feed.

EXAMPLE 2

Another sample of the same reformate was batch-extracted once, with the same solvent as that in Example 1 and using a 1/1 solvent ratio. By using conventional water-washing techniques, a raffinate containing 38.0% v. aromatics and extract containing 63.9% v. aromatics were separated. In other tests, higher solvent ratios reduced the amounts of aromatics in the raffinate, but the aromatics in the extract were less concentrated. For example, a five-to-one solvent ratio resulted in a raffinate aromatics content of 25.6% v. but the extract was only 52.1% v. aromatics.

EXAMPLE 3

In a complete specific embodiment of my process, 1000 b.p.d. of a feed containing 100 b.p.d. of benzene, 300 b.p.d. of toluene, and 600 b.p.d. of hexanes, heptanes, and octanes, are charged to extraction tower 1. Operating conditions in major vessels, and stream compositions, are as follows:

| | |
|---|---|
| Solvent ratio in tower 1 | 1/1. |
| Stages in tower 1 | 10. |
| Plates in paraffin tower 5 | 5. |
| Plates in solvent recovery-tower 18 | 4. |
| Plates in aromatics separation-tower 30 | 20. |
| Reflux ratio in paraffin tower 5 | 3. |
| Temperature in tower 5 | 140° F. |
| Composition of stream 6 | About 50% vol. paraffins and 50% by vol. solvent. |
| Reflux ratio in solvent recovery-tower 18 | 4. |
| Reflux ratio in aromatics separation-tower 30 | 8. |
| Wash-tower 9, packed height | 10 ft. |
| Aromatics tower 30, packed height | 20 ft. |
| Water flow rate in wash-tower 9 | 500 b.p.d. |
| Water flow rate in aromatics recovery-tower 30 | 502 b.p.d. (recycle) plus 498 b.p.d. (fresh). |

Streams:

| | Paraffins | Aromatics | DADC |
|---|---|---|---|
| | B.p.d. | B.p.d. | B.p.d. |
| Raffinate (stream 11) | 386 | 2 | 2 |
| Extract (stream 4) | 214 | 398 | 998 |
| Solvent and aromatics (stream 13) | trace | 378 | 998 |
| Paraffins (streams 8 and 12) | 214 | 2 | trace |

| | |
|---|---|
| Benzene | 99.5+% pure. |
| Toluene | 99.5+% pure. |
| Paraffins (stream 12) | 91.5% pure. |

The foregoing experiments illustrate the high degree of aromatics recovery and solvent separation that is made possible in accordance with this invention. By distillation of the extract phase, an overhead fraction consisting of a paraffinic hydrocarbon-carbamate-solvent, minimum-boiling azeotrope is formed which, on total condensation, forms separate paraffin and solvent phases. The two-phase overhead fraction or azeotrope is obtained at overhead temperatures below the boiling points of the paraffins therein, and below the boiling point of the carbamate solvent. This is unexpected, since the azeotrope forms between substances having no affinity for each other. A direct comparison of the recoveries possible by practicing this invention may be seen by noting that Example II is carried out in accordance with the method of the prior art to yield an extract containing only 52.1% aromatics, while the instant process produces an extract fraction containing over 89% aromatics. Numerous advantages come from this discovery. In order to recover highly pure aromatics or olefins, it is no longer necessary to use the high solvent-to-feed ratios or highly selective solvents of the prior art. The present process eliminates the necessity of steam distillation to recover the aromatics from the solvent. The instant process represents an improvement over those processes wherein partial removal of solvent from the extract phase by distillation is practiced, resulting in a phase separation between an aromatics-solvent phase and a paraffin phase since the former phase must be further treated to recover the aromatics therefrom.

Dimethyl ammonium dimethyl carbamate has been used to illustrate the invention. This compound is a water-white liquid, boiling at about 140.3° F., having a specific gravity of 1.026, an absolute viscosity at 25° C. of 63.3 cps., and a refractive index at 25° C. of 1.4512. Another example is methyl ethyl ammonium methyl ethyl carbamate, boiling at about 131° F., which is also a stable liquid. Certain ammonium derivatives of N-substituted carbamates lack stability, such as the methyl-methyl compound, the ethyl-ethyl compound and the diethyl-diethyl compound, along with certain higher molecular weight derivatives such as the 1-propyl, and n-octyl compounds. As a consequence, these materials cannot be used. Certain other ammonium derivatives of N-substituted carbamates, such as the benzyl-benzyl compound, are solids and either have to be used with an auxiliary solvent or employed at higher temperatures during the extraction. Thus, benzyl ammonium benzyl carbamate and ethyl phenyl ammonium ethyl phenyl carbamate would be used at temperatures above 100° C. (212° F.) in the present process. The boiling point of the carbamate solvent should be within about 100° F. of the boiling point of the major portion of the non-aromatic hydrocarbon in the feed. If the solvent boils at about 20° to 80° F. from the boiling point of the paraffins, good separation is obtained. This means that for practical reasons the paraffinic and aromatic hydrocarbons that may be separated by this process are limited to those which have between about six to nine carbon atoms per molecule.

The process of this invention is carried out in accordance with known methods in the extraction industry with the modifications herein asserted. Any liquid-liquid or liquid-vapor contact method effective in solvent extraction processes may be used. The feed may be treated in one tower or a series of towers, and with one or more successive portions of the carbamate solvent. The portions of solvent used in each successive treatment may vary in accordance with the extent of extraction sought. The process may be batch-wise or continuous, and countercurrent flow in a vertical tower may be used.

Although low solvent-to-feed ratios of about 0.5:1 to 5:1 are made possible by this invention, higher ratios up to about 10:1 may be used, depending on the type of feed to be treated, the efficiency of the extraction method used, and the extent of extraction desired. The temperature of the extraction process is also subject to variation depending on the foregoing considerations as to solvent ratios and the chemical and physical characteristics of the carbamate solvent used. Temperatures ranging from below ambient temperatures up to the boiling point of the solvent may be used. Higher temperatures may be used with the application of pressure to maintain the solvent in the liquid phase. Where liquid-vapor contact is used, the feed is introduced in vaporized form and refluxed with the liquid phase solvent.

Substantial amounts of water should not be present in the solvent phase of this process. Since most feed materials will contain certain very small amounts of contaminating water, some water will tend to accumulate in the system. Steps should be taken to prevent this accumulation from increasing over about 0.1% by volume of the solvent phase. Redistillation of the solvent, passage through a dehydrating agent, and similar means may be used to maintain the system substantially free of water.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic or naphthenic-type hydrocarbon admixed with benzene, toluene, the xylenes, that is, o-xylene, m-xylene and p-xylene, and also ethyl benzene, as simple or complex multi-component mixtures, may be used as the starting material. Such feed materials as petroleum distillates, naphthas, gasoline, kerosene, fuel oil fractions, and gas oil fractions may be used. The charge material should be liquid at ordinary temperatures and not subject to decomposition at the extraction temperatures or reaction with the selective solvents used herein. One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON, clear, of 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an IBP of 128° F., an EBP of 405° F., a RON, clear, of 89.4, a RON + .3 cc. TEL of 98.2, and containing about 48.0 vol. percent paraffins and naphthenes, 1.0 vol. percent olefins and 51.0 vol. percent of aromatics. By precise fractination and blending to different octane numbers, it was determined that this reformate feed material exhibited the following analysis:

Table I
AROMATICS IN REFORMATE FEED

| Aromatic: | Vol. percent |
|---|---|
| Benzene | 4.19 |
| Toluene | 13.1 |
| Mixed xylene and ethyl benzene | 16.51 |
| $C_9$ and heavier | 17.2 |

Examples of the composition of other reformate feed hydrocarbons that may be used are shown in Table II giving the volume percent of aromatics in each, and the research octane level to which the reforming reaction was directed in each instance.

Table II
AROMATICS DISTRIBUTION IN VARIOUS REFORMATES[1] (VOLUME PERCENT)

| Aromatic | 85 Research Octane Level | 95 Research Octane Level |
|---|---|---|
| Benzene | 2.96 | 3.41 |
| Toluene | 9.64 | 12.9 |
| Ethyl-benzene | 2.55 | 2.72 |
| p-xylene | 2.74 | 2.83 |
| m-xylene | 6.45 | 6.73 |
| o-xylene | 3.96 | 3.81 |
| $C_9$ and heavier aromatics | 17.3 | 22.4 |
| Total | 45.6 | 54.8 |

[1] These reformate products were from different feed stocks.

In general these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane, and other $C_8$ hydrocarbons, toluene, ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

The general and preferred conditions to be applied to the process steps of this invention are set forth in the following table:

Table III

| Process Step and Vessel | Process Conditions | |
|---|---|---|
| | Range | Preferred |
| Primary Extraction (tower 1): | | |
| Temperature, °F | 30–140 | 100–120 |
| Pressure, p.s.i.a | 15–30 | 20 |
| Solvent/feed ratio | 1–10:1 | 5:1 |
| Reflux ratio (aromatics/feed) | 1–5 | 1 |
| Azeotrope formation (tower 5): | | |
| Temperature, reboiler, °F | 120–140 | 140 |
| Pressure, p.s.i.a | 5–30 | 15 |
| Aromatics content of feed, v. percent | 10–50 | 20 |
| Reflux ratio (solvent phase/feed) | 0.1–1 | 0.2–0.5 |
| Paraffin washing (tower 9): | | |
| Temperature, °F | 30–140 | 100–120 |
| Pressure, p.s.i.a | 15–30 | 20 |
| Water/feed ratio | 0.01–0.1 | 0.01–.05 |
| Aromatics washing (tower 15): | | |
| Temperature, °F | 30–140 | 100–120 |
| Pressure, p.s.i.a | 15–30 | 20 |
| Water/feed ratio | 0.3–1.0 | 0.5 |
| Solvent recovery (tower 18): | | |
| Temperature, °F | 100–140 | 140 |
| Pressure, p.s.i.a | 1–15 | 15 |
| Reflux ratio | 2–8 | 4 |
| Aromatics recovery (tower 30):[1] | | |
| Temperature, reboiler, °F | 200–275 | 250 |
| Pressure, p.s.i.a | 5–30 | 15 |
| Reflux ratio, benzene/feed | 2–8 | 4 |

[1] For benzene separation from toluene and xylene.

Although the invention has been demonstrated by specific examples, these are not to be construed as limiting to the scope thereof.

Also, the composition of the azeotrope formed between the carbamate solvent and the paraffinic hydrocarbons is not to be considered as limited to the 1:1 volume ratios disclosed nor to a two-component azeotrope. The azeotrope may contain a small or trace amount of aromatics, depending on the type of feed used and the process conditions in the primary extraction. The presence or absence of aromatics does not appear to influence the unusual phase separation on total condensation during which operation the solvent takes out the trace of aromatics leaving a substantially pure paraffinic upper phase. The only limitations attaching to this invention appear in the appended claims.

What is claimed is:

1. The process of separating aromatic hydrocarbons from paraffinic hydrocarbon mixtures containing same which comprises contacting said mixture with a stable N-substituted ammonium carbamate solvent wherein the substitutent radicals are selected from the group of methyl, ethyl, phenyl and benzyl radicals in an extracting treatment, said solvent being capable of forming an azeotrope with said paraffinic hydrocarbons, separating the composite mixture into two component parts consisting of a raffinate phase and an extract phase, heating said extract phase to a temperature sufficient to produce an overhead fraction comprising an azeotrope of said solvent and a substantial portion of the paraffinic hydrocarbons contained therein, and a bottoms fraction, totally condensing said overhead fraction to thereby form two liquid phases, separating said phases, one comprising paraffinic hydrocarbons and the other comprising said solvent, and recovering purified aromatic hydrocarbons from said bottoms fraction.

2. The process in accordance with claim 1 in which said aromatic hydrocarbons are selected from the group of benzene, toluene, ethylbenzene, o-xylene, m-xylene, p-xylene and their mixtures.

3. The process in accordance with claim 1 in which said hydrocarbon mixture comprises a catalytic reformate having a boiling range of about 100° to 450° F.

4. The process in accordance with claim 20, in which said solvent is dimethyl ammonium dimethyl carbamate.

5. The process of separating aromatic hydrocarbons from paraffinic hydrocarbon mixtures containing same which comprises contacting said mixture with a stable N-substituted ammonium carbamate solvent wherein the substituent radicals are selected from the group of methyl, ethyl, phenyl, and benzyl radicals in an extracting treatment, said solvent being capable of forming an azeotrope with said paraffinic hydrocarbons, separating the composite mixture into two component parts consisting of a raffinate phase and an extract phase, heating said extract phase to a temperature sufficient to produce an overhead fraction comprising an azeotrope of said solvent and a substantial portion of the paraffinic hydrocarbons contained therein, and a bottoms fraction, totally condensing said overhead fraction to thereby form two liquid phases, separating said phases, one comprising paraffinic hydrocarbons and the other comprising said solvent, recycling at least a portion of said separated solvent phase to said heating step, and recovering purified aromatic hydrocarbons from said bottoms fraction.

6. The method in accordance with claim 5 in which said solvent phase is recycled to said heating step at a rate sufficient to establish a reflux ratio of solvent phase to feed of about 0.1 to 1.0 therein.

7. The method in accordance with claim 5 in which said heating step is conducted at a temperature of about 120° to 140° F., at pressures above atmospheric, and the reflux ratio of solvent phase returning from said condensation is between about 0.1 to 1.0 based on the amount of solvent extract therein.

8. The process of separating aromatic hydrocarbons from paraffinic hydrocarbon mixtures containing same which comprises contacting said mixture with a stable N-substituted ammonium carbamate solvent wherein the substituent radicals are selected from the group of methyl, ethyl, phenyl, and benzyl radicals in an extracting treatment, said solvent being capable of forming an azeotrope with said paraffinic hydrocarbons, separating a raffinate and an extract phase therefrom, subjecting said extract phase to distillation to produce an overhead azeotropic mixture of said solvent and a substantial portion of said paraffinic hydrocarbons, recovering a bottoms fraction from said distillation comprising a substantial portion of said solvent and said aromatics, totally condensing said overhead azeotropic mixture to form a lower solvent phase and an upper paraffinic hydrocarbon phase, recovering solvent from said lower solvent phase and from said upper paraffinic hydrocarbon phase, and recovering purified aromatics from said bottoms fraction.

9. The process in accordance with claim 8 in which said aromatic hydrocarbon is benzene.

10. The process in accordance with claim 21 in which said solvent is dimethyl ammonium dimethyl carbamate.

11. The process of separating aromatic hydrocarbons from paraffinic hydrocarbon mixtures containing same which comprises contacting said mixture with dimethyl ammonium dimethyl carbamate, separating an extract phase and a raffinate phase from said contacting, distilling said extract phase in a distillation zone, totally condensing the overhead fraction to separate a lower solvent phase and an upper paraffinic phase, recycling said lower solvent phase to said distillation zone, separating a bottoms extract phase from said distillation zone, mixing the raffinate phase with said upper paraffinic phase, water washing the mixed phases, separating a combined paraffinic and raffinate phase from the water phase, mixing the water phase with said bottoms extract phase, separating a solvent-water phase and aromatic hydrocarbon phase therefrom, distilling said aromatic hydrocarbon phase, separating solvent and water from said solvent-water phase, recycling said solvent to said contacting step and recycling said water to said water-washing step.

12. The process in accordance with claim 11 in which said carbamate solvent is substantially anhydrous.

13. The process in accordance with claim 12 in which said carbamate solvent contains no more than about 0.1 volume percent of water.

14. The method in accordance with claim 11 in which said hydrocarbon mixture is a catalytic reformate having a boiling range of about 100° to 450° F. and containing about 45% to 55% by volume of aromatics.

15. The process in accordance with claim 14 in which said catalytic reformate contains more than 50% by volume of aromatics and said feed hydrocarbon mixture is introduced directly into said distillation zone in the presence of said solvent.

16. The process in accordance with claim 11 in which said hydrocarbon mixture comprises a mixture of a benzene concentrate, a toluene concentrate and a xylene concentrate resulting from the fractionation of catalytic reformate having a boiling range of about 100° F. to 450° F.

17. The process in accordance with claim 16 in which said mixture of concentrates comprises 1 part benzene concentrate, 2 parts toluene concentrate and 1 part xylene concentrate and said mixture is introduced directly into said distillation zone in the presence of said solvent.

18. The process of separating aromatic hydrocarbons selected from the group consisting of benzene, toluene, o-xylene, m-xylene, p-xylene, ethyl benzene and their mixtures from catalytic reformates containing paraffinic hydrocarbons, and selected fractions thereof, which comprises subjecting said catalytic reformates to selective solvent extraction by contact with a N-substituted ammonium carbamate solvent wherein the substituent radicals are selected from the group of methyl, ethyl, phenyl, and benzyl radicals boiling from about 0° F. to 100° F. higher than the paraffinic portion of said catalytic reformate, at a temperature of about 30° to 140° F., said solvent being present in an amount sufficient to extract said aromatic hydrocarbons and form a separate aromatic-rich extract phase, and a raffinate phase containing a substantial portion of said paraffinic hydrocarbons, separating said extract and said raffinate phases, separately distilling said extract phase in a distillation zone to produce an overhead fraction comprising a minimum-boiling azeotrope of said solvent and the paraffinic hydrocarbons contained in said extract phase, totally condensing said azeotrope to separate a lower solvent phase and an upper paraffinic phase, recycling said solvent phase to said distillation zone at a reflux ratio of solvent to extract feed thereto of about 0.1 to 1.0, separating a bottoms extract phase from said distillation zone, mixing the raffinate phase with said upper paraffinic phase, water washing the mixed phases, separating a combined paraffinic and raffinate phase from the water phase, mixing the water phase with said bottoms extract phase, separating a solvent-water phase and an aromatic hydrocarbon phase therefrom, distilling said aromatic hydrocarbon phase, separating solvent and water from said solvent-water phase, recycling said solvent to said contacting step and recycling said water to said water-washing step.

19. The process in accordance with claim 18 in which said solvent is dimethyl ammonium dimethyl carbamate.

20. The process in accordance with claim 1 in which the solvent is selected from the group consisting of dimethyl ammonium dimethyl carbamate, methyl ethyl ammonium methyl ethyl carbamate, benzyl ammonium benzyl carbamate, and ethyl phenyl ammonium ethyl phenyl carbamate.

21. The process in accordance with claim 8 in which the solvent is selected from the group consisting of dimethyl ammonium dimethyl carbamate, methyl ethyl ammonium methyl ethyl carbamate, benzyl ammonium benzyl carbamate, and ethyl phenyl ammonium ethyl phenyl carbamate.

References Cited in the file of this patent

UNITED STATES PATENTS

| | | |
|---|---|---|
| 2,085,546 | Roelfsema | June 29, 1937 |
| 2,463,479 | Denton et al. | Mar. 1, 1949 |
| 2,594,044 | Loder | Apr. 22, 1952 |